United States Patent
Ueda et al.

(10) Patent No.: US 10,443,912 B2
(45) Date of Patent: Oct. 15, 2019

(54) REFRIGERANT CIRCULATION DEVICE, METHOD FOR CIRCULATING REFRIGERANT AND ACID SUPPRESSION METHOD

(71) Applicants: MITSUBISHI HEAVY INDUSTRIES THERMAL SYSTEMS, LTD., Tokyo (JP); CENTRAL GLASS CO., LTD., Ube-shi, Yamaguchi (JP)

(72) Inventors: Kenji Ueda, Tokyo (JP); Naoki Kobayashi, Tokyo (JP); Yoshinori Akamatsu, Tokyo (JP); Fuyuhiko Sakyu, Tokyo (JP); Yoshio Nishiguchi, Saitama (JP)

(73) Assignees: MITSUBISHI HEAVY INDUSTRIES THERMAL SYSTEMS, LTD., Tokyo (JP); CENTRAL GLASS CO., LTD., Yamaguchi (JP)

( * ) Notice: Subject to any disclaimer, the term of this patent is extended or adjusted under 35 U.S.C. 154(b) by 0 days.

(21) Appl. No.: 14/914,589

(22) PCT Filed: Oct. 23, 2014

(86) PCT No.: PCT/JP2014/078260
§ 371 (c)(1),
(2) Date: Feb. 25, 2016

(87) PCT Pub. No.: WO2015/060407
PCT Pub. Date: Apr. 30, 2015

(65) Prior Publication Data
US 2016/0201958 A1     Jul. 14, 2016

(30) Foreign Application Priority Data

Oct. 25, 2013    (JP) ................................. 2013-222326

(51) Int. Cl.
*F25B 43/00*     (2006.01)
*C09K 5/04*     (2006.01)
(Continued)

(52) U.S. Cl.
CPC ............ *F25B 43/003* (2013.01); *C09K 5/044* (2013.01); *C09K 5/045* (2013.01); *F25B 30/02* (2013.01);
(Continued)

(58) Field of Classification Search
CPC .. C09K 5/044; C09K 5/045; C09K 2205/126; F25B 30/02; F25B 43/003; F25B 49/005
See application file for complete search history.

(56) References Cited

U.S. PATENT DOCUMENTS 6,840,058 B2 *   1/2005   Suzuki .................. B01J 20/041
                                                   62/474
7,282,601 B2 *   10/2007   Kawahara ............... C07C 69/75
                                                   560/127
(Continued)

FOREIGN PATENT DOCUMENTS

CN         1404569 A      3/2003
CN       101573564 A     11/2009
(Continued)

OTHER PUBLICATIONS

Extended European Search Report, dated Jul. 29, 2016, for European Application No. 14855304.3.
(Continued)

*Primary Examiner* — Frantz F Jules
*Assistant Examiner* — Martha Tadesse
(74) *Attorney, Agent, or Firm* — Birch, Stewart, Kolasch & Birch, LLP

(57) ABSTRACT

The present invention provides a heat pump device and an organic Rankine cycle device that are capable of maintain-
(Continued)

ing a stable thermal cycle even when an HFO is used as the refrigerant in an environment in which the operating temperature reaches a high temperature. The refrigerant circulation device is filled with a refrigerant comprising a hydrofluoroolefin or hydrochlorofluoroolefin having a carbon-carbon double bond within the molecular structure, and has a region in the refrigerant circulation circuit where the operating temperature of the refrigerant reaches 175° C. or higher, wherein an acid suppression unit which suppresses any increase in the acid concentration in the refrigerant is provided in the region where the operating temperature of the refrigerant can reach 175° C. or higher, and the acid suppression unit contains an acid suppression material comprising at least two materials selected from the group consisting of copper, iron, aluminum, SUS, nickel, titanium, metallic silicon, silicon steel, tin, magnesium and zinc as the main components.

11 Claims, 7 Drawing Sheets

(51) Int. Cl.
*F25B 30/02* (2006.01)
*F25B 49/00* (2006.01)

(52) U.S. Cl.
CPC ...... *F25B 49/005* (2013.01); *C09K 2205/126* (2013.01)

(56) References Cited

U.S. PATENT DOCUMENTS

| | | | |
|---|---|---|---|
| 2002/0023448 A1* | 2/2002 | Ito | B60H 1/3227 |
| | | | 62/222 |
| 2003/0140649 A1* | 7/2003 | Suzuki | B01J 20/041 |
| | | | 62/474 |
| 2004/0119047 A1 | 6/2004 | Singh et al. | |
| 2006/0243944 A1 | 11/2006 | Minor et al. | |
| 2006/0243945 A1 | 11/2006 | Minor et al. | |
| 2008/0103342 A1 | 5/2008 | Wang et al. | |
| 2008/0230738 A1 | 9/2008 | Minor et al. | |
| 2009/0120619 A1 | 5/2009 | Sievert et al. | |
| 2009/0211734 A1 | 8/2009 | Benstead et al. | |
| 2009/0249809 A1 | 10/2009 | Minor et al. | |
| 2009/0249864 A1 | 10/2009 | Minor et al. | |
| 2009/0250650 A1 | 10/2009 | Minor et al. | |
| 2009/0255285 A1 | 10/2009 | Minor et al. | |
| 2009/0272931 A1 | 11/2009 | Minor et al. | |
| 2009/0277194 A1 | 11/2009 | Minor et al. | |
| 2009/0278072 A1 | 11/2009 | Minor et al. | |
| 2010/0012302 A1 | 1/2010 | Clodic et al. | |
| 2010/0152504 A1 | 6/2010 | Hulse et al. | |
| 2011/0023535 A1 | 2/2011 | Morimoto et al. | |
| 2011/0079040 A1* | 4/2011 | Morimoto | F25B 43/003 |
| | | | 62/474 |
| 2011/0185765 A1 | 8/2011 | Nishii et al. | |
| 2011/0197616 A1 | 8/2011 | Nishii et al. | |
| 2011/0204279 A1 | 8/2011 | Minor et al. | |
| 2011/0290447 A1 | 12/2011 | Clodic et al. | |
| 2012/0117991 A1 | 5/2012 | Rached | |
| 2012/0131947 A1 | 5/2012 | Nakano et al. | |
| 2012/0256120 A1* | 10/2012 | Bouvier | C09K 5/045 |
| | | | 252/68 |
| 2012/0304687 A1* | 12/2012 | Sato | C09K 5/045 |
| | | | 62/502 |
| 2012/0324926 A1 | 12/2012 | Rached et al. | |
| 2013/0098101 A1* | 4/2013 | Ishida | C09K 5/045 |
| | | | 62/468 |
| 2013/0283830 A1* | 10/2013 | Jandal | F25B 43/003 |
| | | | 62/85 |
| 2014/0070132 A1 | 3/2014 | Fukushima | |
| 2014/0077122 A1 | 3/2014 | Fukushima | |
| 2014/0174084 A1 | 6/2014 | Kontomaris | |
| 2014/0283537 A1 | 9/2014 | Minor et al. | |
| 2016/0017231 A1 | 1/2016 | Singh et al. | |
| 2016/0115827 A1 | 4/2016 | Rached | |

FOREIGN PATENT DOCUMENTS

| | | | |
|---|---|---|---|
| CN | 102203526 A | 9/2011 | |
| CN | 102471671 A | 5/2012 | |
| EP | 2 339 271 A1 | 6/2011 | |
| EP | 2960601 A1 * | 12/2015 | ............ F25B 43/003 |
| GB | 296498 A * | 9/1928 | ............ F25B 43/003 |
| GB | 296498 A * | 9/1928 | ............ F25B 43/003 |
| JP | 7-018173 U | 3/1995 | |
| JP | 7-294066 A | 11/1995 | |
| JP | 07294066 A * | 11/1995 | |
| JP | 2006-089801 A | 4/2006 | |
| JP | 2006-512426 A | 4/2006 | |
| JP | 2007-315663 A | 12/2007 | |
| JP | 2008-110979 A | 5/2008 | |
| JP | 2008-531836 A | 8/2008 | |
| JP | 2008-544072 A | 12/2008 | |
| JP | 2009-222329 A | 10/2009 | |
| JP | 2010-012927 A | 1/2010 | |
| JP | 2010-121927 A | 6/2010 | |
| JP | 2010-526982 A | 8/2010 | |
| JP | 2010-203759 A | 9/2010 | |
| JP | 2010-210224 A | 9/2010 | |
| JP | 2010-235950 A | 10/2010 | |
| JP | 2010-236725 A | 10/2010 | |
| JP | 2010-236726 A | 10/2010 | |
| JP | 2010-243148 A | 10/2010 | |
| JP | 4571183 B2 | 10/2010 | |
| JP | 2010-265429 A | 11/2010 | |
| JP | 2011-226728 A | 11/2011 | |
| JP | 2011-237146 A | 11/2011 | |
| JP | 2012-012532 A | 1/2012 | |
| JP | 2013-525720 A | 6/2013 | |
| WO | WO 2007/002625 A2 | 1/2007 | |
| WO | WO 2010/047116 A1 | 4/2010 | |
| WO | WO 2012/001842 A1 | 1/2012 | |
| WO | WO 2012/157762 A1 | 11/2012 | |
| WO | WO 2012/157763 A1 | 11/2012 | |
| WO | WO 2012/157764 A1 | 11/2012 | |
| WO | WO 2013/028476 A2 | 2/2013 | |

OTHER PUBLICATIONS

Extended European Search Report, dated Jul. 29, 2016, for European Application No. 14855590.7.
International Search Report issued in PCT/JP2014/078260, dated Jan. 27, 2015.
Written Opinion of the International Searching Authority issued in PCT/JP2014/078260, dated Jan. 27, 2015.
Chinese Office Action and Chinese Search Report, dated Nov. 28, 2016, for Chinese Application No. 201480046122.2 with English translations.
State Intellectual Property Office of People's Republic of China, "First Office Action," issued in connection with Chinese Patent Application No. 201480046121.8, dated Jan. 22, 2017.
Office Action dated Sep. 4, 2018 issued in U.S. Appl. No. 14/914,519.

* cited by examiner

REFRIGERANT CIRCULATION DEVICE, METHOD FOR CIRCULATING REFRIGERANT AND ACID SUPPRESSION METHOD

TECHNICAL FIELD

The present invention relates to a refrigerant circulation device that uses a refrigerant, a method for circulating a refrigerant and an acid suppression method, and relates particularly to a heat pump device, an organic Rankine cycle device, and a method for circulating a refrigerant and an acid suppression method for use in these devices.

BACKGROUND ART

Conventionally, hydrofluorocarbon (HFC) based refrigerants have been used as the refrigerants for heat pump devices and organic Rankine cycle devices. HFC-based refrigerants have an ozone layer depletion coefficient of zero, and have high thermal stability. However, HFC-based refrigerants have an extremely high global warming potential (GWP). As a result, the use of HFC-based refrigerants is undesirable from the viewpoint of global environmental protection.

Examples of known refrigerants having a low GWP include hydrofluoroolefin (HFO) and hydrochlorofluoroolefin (HCFO) based refrigerants. Patent Literature 1 (PTL 1) discloses a cooling cycle device which uses a refrigerant containing an HFO as the base component. In PTL 1, a tetrafluoropropene (HFO1234yf) is used as the HFO-based refrigerant.

HFO and HCFO compounds have a double bond within the molecular structure. As a result, HFO-based refrigerants and HCFO-based refrigerants have lower chemical stability than HFC refrigerants. When HFO and HCFO compounds are used as refrigerants, a problem arises in that the effects of water and oxygen can cause cleavage and decomposition of the compounds, generating substances containing acids as the main components. Substances containing acids as the main components can degrade the materials used in the cooling cycle device and the refrigerating machine oil, causing a deterioration in the performance of the cooling cycle device.

In order to address the above problem, the cooling cycle device disclosed in PTL 1 comprises an adsorption device within the cooling cycle. This adsorption device contains an adsorbent that can adsorb substances containing hydrofluoric acid (HF) as the main component. The adsorbent comprises a zeolite, silica, or ion exchange resin or the like the main component.

CITATION LIST

Patent Literature

{PTL 1} Japanese Unexamined Patent Application, Publication No. 2010-121927 ({0009})

SUMMARY OF INVENTION

Technical Problem

Heat pump devices and organic Rankine cycle devices include devices in which the operating temperature of the refrigerant reaches a high temperature exceeding 170° C. HFO-based refrigerants and HCFO-based refrigerants thermally decompose in high-temperature environments, and as a result, acid is generated. Accordingly, HFO-based refrigerants and HCFO-based refrigerants have a problem in that they cannot be used under conditions where the operating temperature reaches a high temperature.

The cooling cycle device disclosed in PTL 1 assumes use of the device under temperature conditions of about 60° C. Accordingly, the adsorption device disclosed in PTL 1 cannot be used in high-temperature environments exceeding 170° C. As a result, the technology disclosed in PTL 1 cannot be applied in refrigerant circulation devices in which the operating temperature for the refrigerant exceeds 170° C.

The present invention has been developed in light of these circumstances, and has an object of providing a heat pump device and an organic Rankine cycle device that are capable of maintaining a stable thermal cycle even when an HFO or HCFO is used as the refrigerant in an environment in which the operating temperature reaches a high temperature, as well as providing a method for circulating a refrigerant and an acid suppression method for use in these devices.

Solution to Problem

In order to achieve the above object, a refrigerant circulation device, a method for circulating a refrigerant and an acid suppression method according to the present invention adopt the aspects described below.

The present invention provides a refrigerant circulation device which is filled with a refrigerant comprising a hydrofluoroolefin or hydrochlorofluoroolefin having a carbon-carbon double bond within the molecular structure, and has a region in the refrigerant circulation circuit where the operating temperature of the refrigerant reaches 175° C. or higher, wherein an acid suppression unit which suppresses any increase in the concentration of acid generated within the refrigerant is provided in the region where the operating temperature of the refrigerant can reach 175° C. or higher, and the acid suppression unit contains an acid suppression material comprising at least two materials selected from the group consisting of copper, iron, aluminum, nickel, titanium, metallic silicon, silicon steel, tin, magnesium, zinc and SUS as the main components.

The present invention also provides an acid suppression method for a refrigerant circulation device which is filled with a refrigerant comprising a hydrofluoroolefin or hydrochlorofluoroolefin having a carbon-carbon double bond within the molecular structure, and has a region in the refrigerant circulation circuit where the operating temperature of the refrigerant reaches 175° C. or higher, wherein an acid suppression unit which suppresses any increase in the concentration of acid generated within the refrigerant is provided in the region where the operating temperature of the refrigerant can reach 175° C. or higher, and the acid suppression unit contains an acid suppression material comprising at least two materials selected from the group consisting of copper, iron, aluminum, nickel, titanium, metallic silicon, silicon steel, tin, magnesium, zinc and SUS as the main components, the method comprising bringing the refrigerant into contact with the acid suppression material.

The present invention also provides a method for circulating a refrigerant in a refrigerant circulation device which is filled with a refrigerant comprising a hydrofluoroolefin or hydrochlorofluoroolefin having a carbon-carbon double bond within the molecular structure, and has a region in the refrigerant circulation circuit where the operating temperature of the refrigerant reaches 175° C. or higher, wherein an acid suppression unit which suppresses any increase in the concentration of acid generated within the refrigerant is provided in the region where the operating temperature of the refrigerant can reach 175° C. or higher, and the acid suppression unit contains an acid suppression material comprising at least two materials selected from the group consisting of copper, iron, aluminum, nickel, titanium, metallic silicon, silicon steel, tin, magnesium, zinc and SUS a the main components, the method comprising bringing the refrigerant into contact with the acid suppression material.

The inventors of the present invention discovered that in high-temperature environments of 175° C. or higher, a hydrofluoroolefin (or hydrochlorofluoroolefin) readily decomposes, acid (hydrofluoric acid or hydrochloric acid) tends to be produced, and the produced acid accelerates the decomposition of the hydrofluoroolefin (or hydrochlorofluoroolefin). According to the present invention, by providing the acid suppression unit, increases in the acid concentration in the refrigerant can be suppressed. As a result, in a high-temperature environment where the refrigerant is prone to thermal decomposition, accelerated decomposition caused by acid is suppressed, and practically applicable thermophysical properties can be maintained for the life cycle of the device. During the refrigerant circulation, the refrigerant may be heated and/or cooled, and may be pressurized and/or placed under reduced pressure.

According to the present invention, by selecting the acid suppression material from among the materials listed above, increases in the acid concentration in the refrigerant can be suppressed, even in high-temperature environments of 175° C. or higher. In particular, the acid suppression material is preferably a structure comprising a mixture of copper, iron and aluminum.

In one aspect of the invention described above, the acid suppression material is preferably a porous structure, a mesh structure or a corrugated structure.

By using an acid suppression material having the type of structure described above, the contact surface area between the refrigerant and the acid suppression material increases. As a result, increases in the acid concentration in the refrigerant can be better suppressed.

In one aspect of the invention described above, the refrigerant circulation device comprises a compressor which compresses the refrigerant, a condenser which condenses the compressed refrigerant, an expansion valve which expands the condensed refrigerant, and an evaporator which evaporates the expanded refrigerant, wherein the acid suppression unit can be provided between the compressor and the condenser.

In a refrigerant circulation circuit comprising a compressor, a condenser, an expansion valve and an evaporator connected in sequence, the region from the compressor to the condenser is a high-temperature, high-pressure environment where the refrigerant exists as a gas. Hydroolefins tend to undergo decomposition reactions in high-temperature environments. In the aspect of the invention described above, by providing the acid suppression unit between the compressor and the condenser, increases in the acid concentration in the refrigerant can be efficiently suppressed.

In one aspect of the invention described above, the acid suppression unit may be provided between the condenser and the expansion valve.

In a refrigerant circulation device, the refrigerant is condensed by the condenser and becomes a liquid. The liquefied refrigerant occupies a smaller volume than the gaseous refrigerant. According to the aspect of the invention described above, by providing the acid suppression unit between the condenser and the expansion valve, a larger proportion of the refrigerant can be brought into contact with the acid suppression material.

In one aspect of the invention described above, the acid suppression unit may be integrated within the condenser.

Pressure from the refrigerant acts upon the structural elements of the refrigerant circulation device. As a result, the structural elements of the refrigerant circulation device must have sufficient rigidity to be able to withstand this pressure from the refrigerant. According to the aspect of the invention described above, by integrating the acid suppression unit within the condenser, there is no need to provide a new pressure-resistant container. Accordingly, the refrigerant circulation device can be lightened.

In one aspect of the invention described above, the refrigerant circulation device comprises a pump which force feeds the refrigerant, an evaporator which heats and evaporates the force fed refrigerant using a heat source, an expansion device which expands the evaporated refrigerant, and a condenser which condenses the expanded refrigerant, wherein the acid suppression unit can be provided between the evaporator and the expansion device.

In a refrigerant circulation circuit comprising a pump, an evaporator, an expansion device and a condenser connected in sequence, the region from the evaporator to the expansion device is a high-temperature, high-pressure environment where the refrigerant exists as a gas, and is therefore the region where decomposition of the refrigerant can proceed most readily. In the aspect of the invention described above, by providing the acid suppression unit between the evaporator and the expansion device, increases in the acid concentration in the refrigerant can be suppressed.

The acid suppression unit may also be provided between the evaporator and the aforementioned force feed pump. According to this aspect of the present invention, by providing the acid suppression unit between the evaporator and the force feed pump, increases in the acid concentration in the refrigerant can be suppressed.

Advantageous Effects of Invention

In the refrigerant circulation device, the acid suppression method and the method for circulating a refrigerant according to the present invention, by providing an acid suppression unit in the high-temperature environment, increases in the acid concentration in the refrigerant can be suppressed. As a result, even if an HFO is used as the refrigerant under conditions where the operating temperature reaches a high temperature, changes in the thermophysical properties of the refrigerant can be suppressed, and a stable refrigerant circulation circuit can be maintained.

DESCRIPTION OF EMBODIMENTS

First Embodiment

Figure 1:
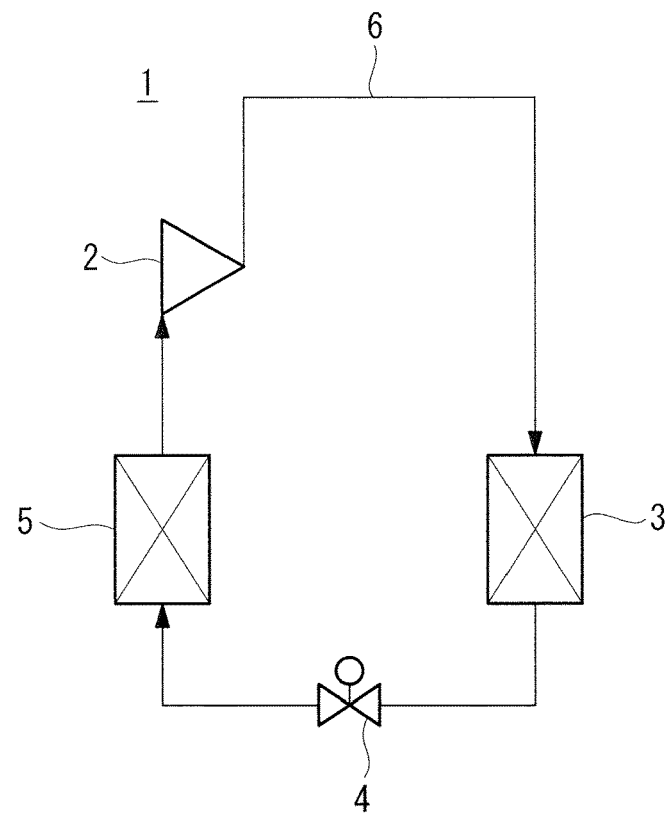
FIG. 1 A schematic structural diagram illustrating one example of a heat pump device according to a first embodiment.
Figure 2:
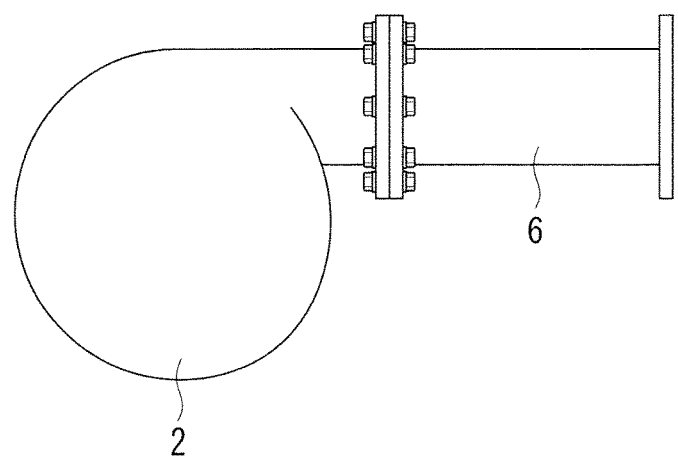
FIG. 2 A side view of the acid suppression unit shown in FIG. 1.
Figure 3:
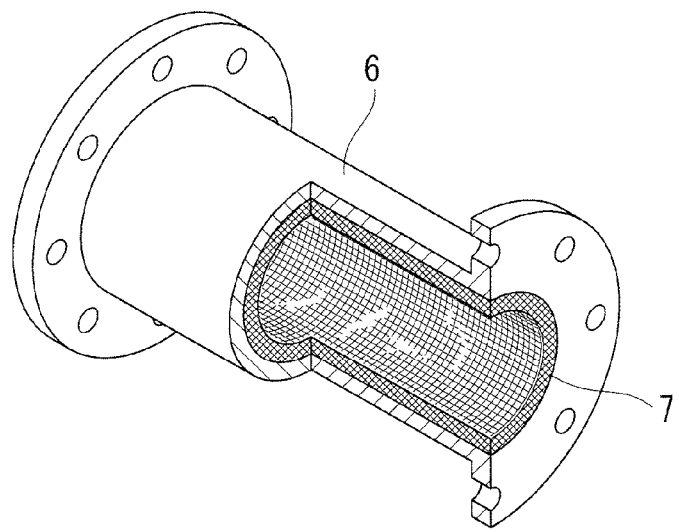
FIG. 3 A perspective view of the acid suppression unit shown in FIG. 1.

FIG. 1 is a schematic structural diagram illustrating one example of a heat pump device (refrigerant circulation device) according to this embodiment. FIG. 2 is a side view of the acid suppression unit of FIG. 1. FIG. 3 is a perspective view of the acid suppression unit of FIG. 1.

The heat pump device 1 comprises a compressor 2, a condenser 3, an expansion valve 4, an evaporator 5 and an acid suppression unit 6. The compressor 2, the condenser 3, the expansion valve 4 and the evaporator 5 form a refrigerant circulation circuit (heat pump cycle) connected in sequence by a series of pipes. Each of the structural members of the heat pump device are designed to be able to withstand the pressure from the refrigerant. The refrigerant fills the inside of the heat pump cycle.

The compressor 2 receives the refrigerant flowing from the evaporator 5, and following compression, discharges the compressed refrigerant to the condenser 3. The compressor 2 can increase the temperature of the refrigerant to 175° C. or higher. The compressor 2 may employ a conventional device such as a turbo compressor or the like. The compressor 2 may be a multi-stage compressor. A plurality of compressors may be provided.

The compressor 2 comprises an inlet port through which the refrigerant is received, and a discharge port through which the compressed refrigerant is discharged. A discharge pipe for discharging the compressed refrigerant gas toward the condenser 3 is connected to the discharge port of the compressor 2.

The condenser 3 cools and condenses the refrigerant that has been compressed by the compressor 2, enabling the formation of a refrigerant liquid. The condenser 3 may be a plate heat exchanger or a shell and tube heat exchanger or the like. Either a single condenser or a plurality of condensers may be provided as the condenser 3. The condenser 3 comprises an inflow pipe through which the compressed refrigerant enters, and an outflow pipe through which the refrigerant that has been condensed by the condenser 3 is discharged.

The expansion valve 4 is a valve that subjects the refrigerant liquid that has been condensed by the condenser 3 to adiabatic expansion and pressure reduction. A conventional expansion valve may be used as the expansion valve 4.

The evaporator 5 evaporates the refrigerant liquid that has undergone adiabatic expansion in the expansion valve 4. The evaporator 5 may be formed from a plate heat exchanger or a shell and tube heat exchanger or the like.

The refrigerant used to fill the inside of the heat pump cycle comprises a hydrofluoroolefin (HFO) or hydrochlorofluoroolefin (HCFO) having a carbon-carbon double bond within the molecular structure. The refrigerant preferably comprises the hydrofluoroolefin (HFO) or hydrochlorofluoroolefin (HCFO) as the main component. The hydrofluoroolefin (HFO) or hydrochlorofluoroolefin (HCFO) typically represents more than 50 GC %, preferably more than 75 GC %, and still more preferably more than 90 GC %, of the refrigerant.

Specifically, examples of the hydrofluoroolefin (HFO) include 2,3,3,3-tetrafluoro-1-propene (HFO1234yf), (Z)-1,3,3,3-tetrafluoro-1-propene (HFO1234ze(Z)), (E)-1,3,3,3-tetrafluoro-1-propene (HFO1234ze(E)), (Z)-1,2,3,3-tetrafluoro-1-propene (HFO1234ye(Z)), (E)-1,2,3,3-tetrafluoro-1-propene (HFO1234ye(E)), (Z)-1,2,3,3,3-pentafluoro-1-propene (HFO1225ye(Z)), (E)-1,2,3,3,3-pentafluoro-1-propene (HFO1225ye(E)) (Z)-1,1,1,4,4,4-hexafluoro-2-butene (HFO1336mzz(Z)), and (E)-1,1,1,4,4,4-hexafluoro-2-butene (HFO1336mzz(E)).

Specifically, examples of the hydrochlorofluoroolefin (HCFO) include (E)-1-chloro-3,3,3-trifluoropropene (HCFO1233zd(E)) and (Z)-1-chloro-3,3,3-trifluoropropene (HCFO1233zd(Z)).

The purity of the hydrofluoroolefin (HFO) or hydrochlorofluoroolefin (HCFO) is preferably at least 97 GC %, more preferably 99 GC % or higher, and still more preferably 99.9 GC % or higher.

The refrigerant may contain one or more additives. Examples of these additives include halocarbons, other hydrofluorocarbons (HFC), alcohols, and saturated hydrocarbons.

<Halocarbons and Other Hydrofluorocarbons>

Examples of the halocarbons include compounds containing one or more halogen atoms such as methylene chloride, trichloroethylene and tetrachloroethylene.

Examples of the hydrofluorocarbons include difluoromethane (HFC-32), 1,1,1,2,2-pentafluoroethane (HFC-125), fluoroethane (HFC-161), 1,1,2,2-tetrafluoroethane (HFC-134), 1,1,1,2-tetrafluoroethane (HFC-134a), 1,1,1-trifluoroethane (HFC-143a), difluoroethane (HFC-152a), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), 1,1,1,2,3-pentafluoropropane (HFC-245eb), 1,1,2,2,3-pentafluoropropane (HFC-245ca), 1,1,1,3,3-pentafluorobutane (HFC-365mfc), 1,1,1,3,3,3-hexafluoroisobutane (HFC-356mmz), and 1,1,1,2,2,3,4,5,5,5-decafluoropentane (HFC-43-10-mee).

<Alcohols>

Examples of the alcohols include alcohols having a carbon number of 1 to 4 such as methanol, ethanol, n-propanol, i-propanol, n-butanol, i-butanol, 2,2,2-trifluoroethanol, pentafluoropropanol, tetrafluoropropanol, and 1,1,1,3,3,3-hexafluoro-2-propanol.

<Saturated Hydrocarbons>

The saturated hydrocarbon may be a mixture of one or more compounds having a carbon number of at least 3 but not more than 8 selected from the group consisting of propane, n-butane, i-butane, neopentane, n-pentane, i-pentane, cyclopentane, methylcyclopentane, n-hexane and cyclohexane. Among these, particularly preferred compounds include neopentane, n-pentane, i-pentane, cyclopentane, methylcyclopentane, n-hexane and cyclohexane.

The acid suppression unit 6 suppresses increases in the acid concentration in the refrigerant. Specifically, the acid suppression unit 6 is provided in the region where the temperature of the refrigerant can reach 175° C. or higher. In the present embodiment, the region where the temperature of the refrigerant can reach 175° C. or higher is the region from the compressor 2 to the condenser 3. The acid suppression unit 6 includes at least a portion of the pipes connecting the compressor 2 and the condenser 3. The acid suppression unit 6 preferably includes all of the pipes connecting the compressor 2 and the condenser 3. In FIG. 2, the acid suppression unit 6 is connected directly to the discharge port of the compressor 2.

The acid suppression unit 6 contains a first acid suppression material.

The first acid suppression material comprises a mixture of different metals. The first acid suppression material comprises at least two materials selected from the group consisting of copper, iron, aluminum, nickel, titanium, metallic silicon, silicon steel, tin, magnesium, zinc and SUS as the main components. The term "main components" means the components that exist in the largest amounts. The copper, iron, aluminum, nickel, titanium, metallic silicon, silicon steel, tin, magnesium and zinc preferably exist as stand-alone metals. The first acid suppression material is preferably a structure comprising a mixture of the three metals copper, iron and aluminum. By selecting the first acid suppression material from the materials mentioned above, increases in the acid concentration in the refrigerant can be suppressed. A first acid suppression material selected from the materials listed above can be used in a high-temperature environment of 175° C. or higher.

The first acid suppression material is preferably used in a state where the main components of the acid suppression material are clearly exposed at the material surface.

The first acid suppression material preferably has a porous structure, a mesh structure or a corrugated structure. The first acid suppression material may also be composed of a plurality of thin plate-like structures arranged in parallel along the direction of flow of the refrigerant (gas). By increasing the surface area across which the first acid suppression material can contact the refrigerant, and ensuring that the first acid suppression material does not inhibit the refrigerant flow, increases in the acid concentration in the refrigerant can be suppressed efficiently, and pressure loss can also be suppressed.

In the present embodiment, the first acid suppression material is disposed inside the acid suppression unit 6. For example, as illustrated in FIG. 3, a mesh structure molded into a cylindrical shape is disposed inside the acid suppression unit 6 as a first acid suppression material 7. In FIG. 3, the outer diameter of the mesh structure is substantially the same as the inner diameter of the acid suppression unit (pipe) 6.

The first acid suppression material 7 is preferably disposed to enable continuous contact with the refrigerant from the time the refrigerant is discharged from the compressor 2 until it flows into the condenser 3. In other words, the mesh structure is preferably disposed along the entire length of the pipes that connect the compressor 2 to the condenser 3 (including the discharge pipe and the inflow pipe).

The inner surface of the acid suppression unit 6 is preferably coated with a second acid suppression material. The second acid suppression material comprises at least one material selected from the group consisting of copper, iron, aluminum, SUS, nickel, titanium, metallic silicon, silicon steel, tin, magnesium and zinc as the main component. The second acid suppression material can be coated onto the inner surface of the acid suppression unit 6 by plating, coating, or vapor deposition or the like. As a result, even if the first acid suppression material is only provided on a portion of the inside of the acid suppression unit 6, the refrigerant is still able to contact an acid suppression material.

Next is a description of the operation of the heat pump device 1.

The refrigerant used to fill the heat pump device 1 is compressed in the compressor 2 and becomes a high-temperature, high-pressure gas. The compressed refrigerant is discharged from the discharge port of the compressor 2. In the heat pump device 1, the refrigerant reaches its highest temperature at the discharge port of the compressor 2.

The discharged refrigerant passes through the acid suppression unit 6 and flows into the condenser 3. During passage through the acid suppression unit 6, the refrigerant can make contact with the acid suppression materials (the first acid suppression material and the second acid suppression material). As a result, increases in the acid concentration in the refrigerant can be suppressed.

The refrigerant that has passed through the acid suppression unit 6 enters the condenser 3. The refrigerant entering the condenser 3 is condensed, and becomes a low-temperature, high-pressure refrigerant liquid.

The condensed refrigerant is subjected to adiabatic expansion by the expansion valve 4, and becomes a low-temperature, low-pressure refrigerant liquid. The adiabatically expanded refrigerant is supplied to the evaporator 5, and is evaporated to form a high-temperature, low-pressure gas. The evaporated refrigerant is then drawn into the compressor 2, and the same cycle is then repeated.

In the heat pump device 1 according to the present embodiment, by providing the acid suppression unit 6 between the compressor 2 and the condenser 3, increases in the acid concentration in the refrigerant are suppressed, and a stable thermal cycle can be maintained.

In the case where the acid suppression unit 6 is connected directly to the compressor 2, as illustrated in FIG. 2, appropriate maintenance of the acid suppression unit (such as replacing the acid suppression material) can be performed during overhauls or when the refrigerant is replaced.

Second Embodiment

Figure 4:
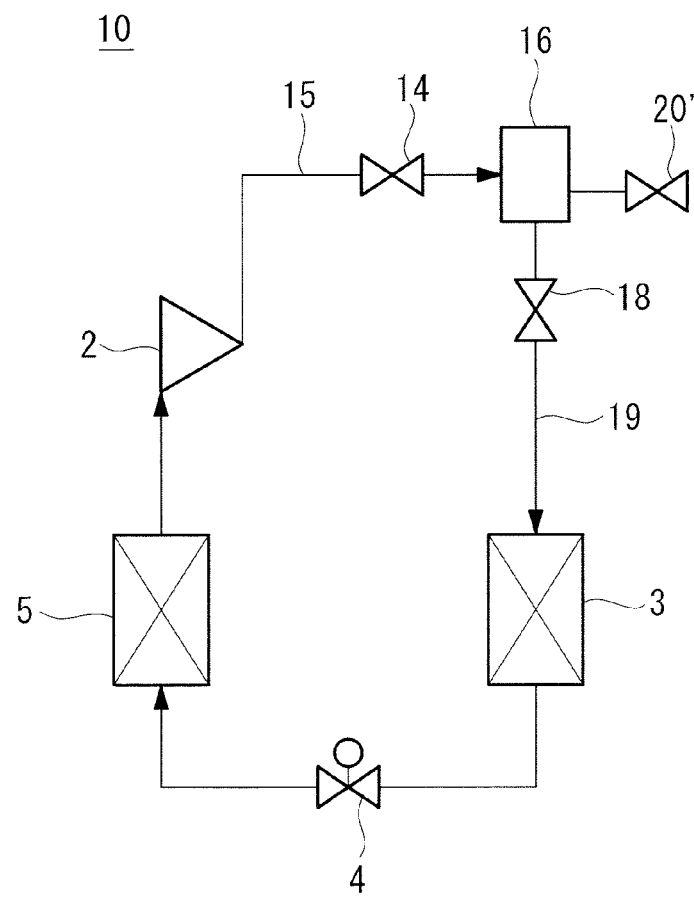
FIG. 4 A schematic structural diagram illustrating one example of a heat pump device according to a second embodiment.
Figure 5:
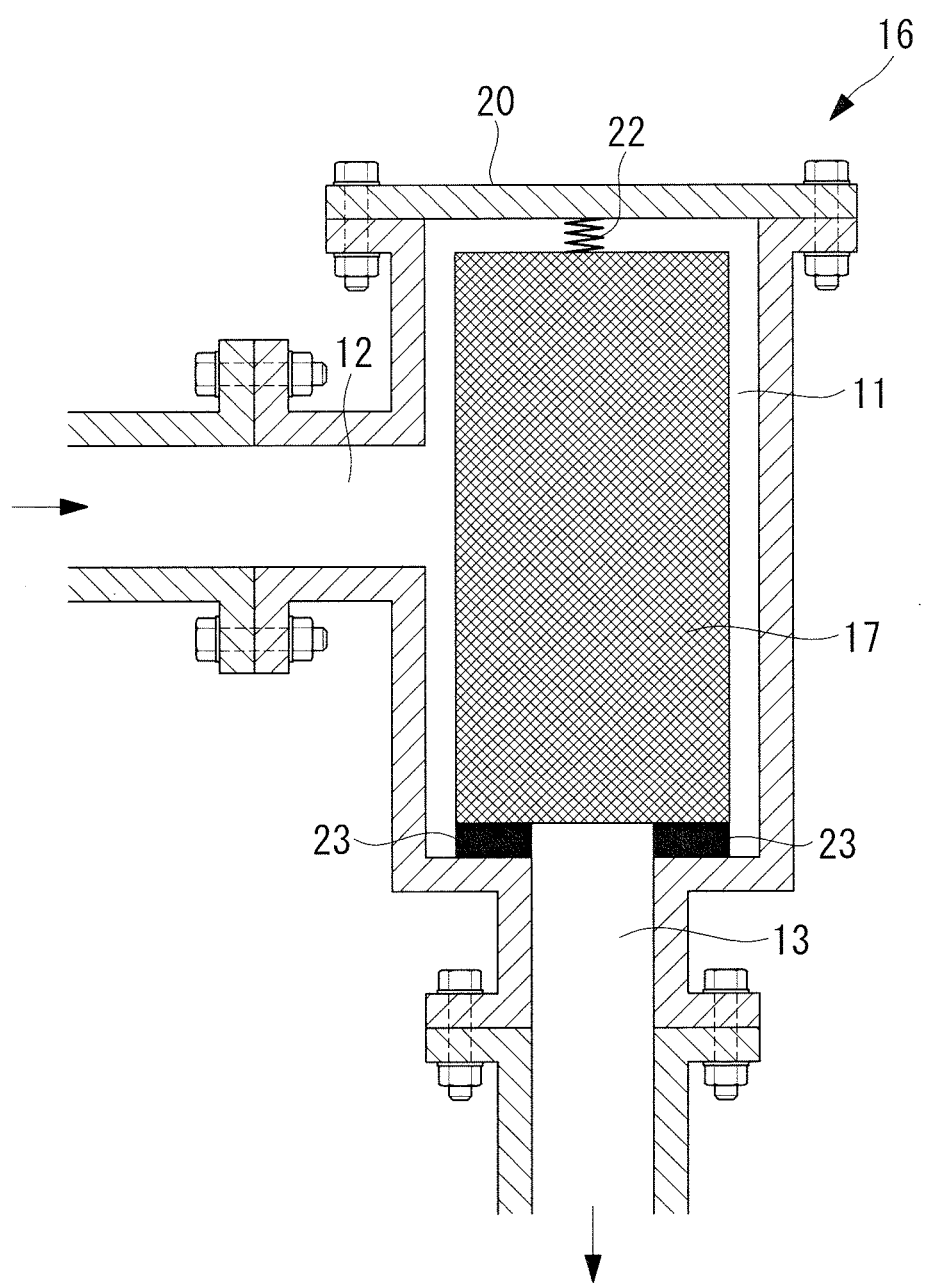
FIG. 5 A cross-sectional view of the acid suppression unit shown in FIG. 4.
Figure 6:
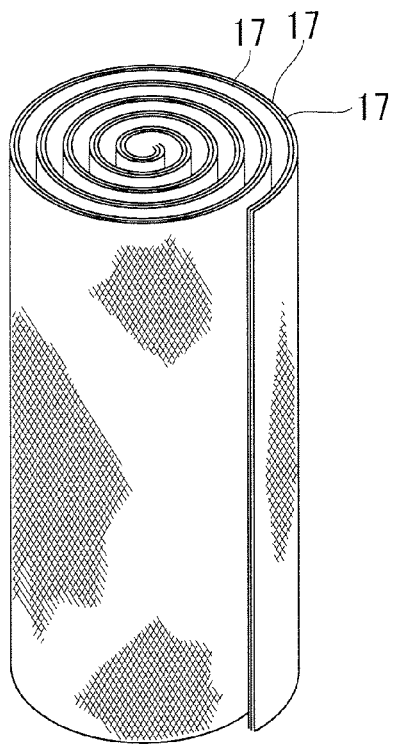
FIG. 6 A perspective view illustrating one example of an acid suppression material.
Figure 7:
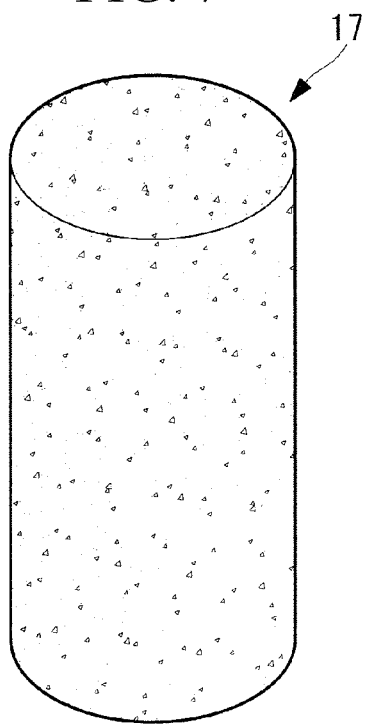
FIG. 7 A perspective view illustrating another example of an acid suppression material.

Unless specifically described otherwise, the structure of the heat pump device according to this embodiment is the same as that of the first embodiment. FIG. 4 is a schematic structural diagram illustrating one example of a heat pump device (refrigerant circulation device) according to this embodiment. FIG. 5 is a cross-sectional view of the acid suppression unit. FIG. 6 and FIG. 7 are perspective views illustrating examples of the acid suppression material.

An acid suppression unit 16 is connected in series within the pipes connecting the compressor 2 to the condenser 3. The acid suppression unit 16 has a storage chamber 11, a refrigerant inlet 12, and a refrigerant outlet 13. The storage chamber 11 has a pressure vessel construction, and houses a first acid suppression material 17 that is able to make contact with the refrigerant. The storage chamber 11 is secured to the condenser 3 of the heat pump device 10 or to a frame installed nearby. The refrigerant inlet 12 is connected to a discharge pipe 15 via a valve 14. The refrigerant inlet 12 guides all of the refrigerant discharged from the compressor 2 into the storage chamber 11. The refrigerant inlet 12 has a structure that causes the refrigerant (gas) to flow smoothly with a swirling motion from the inlet toward the interior. The flow path cross-section of the refrigerant inlet 12 is a structure having a flow path surface area that is sufficiently large to prevent refrigerant (gas) loss. The refrigerant outlet 13 is provided in a position that enables the refrigerant that has been guided into the storage chamber 11 to pass through the first acid suppression material 17 and then flow out toward the condenser 3. The refrigerant outlet 13 is connected to an inflow pipe 19 via a valve 18.

The acid suppression unit 16 preferably includes a maintenance section. In FIG. 5, a maintenance section 20 is provided in the acid suppression unit 16. The maintenance section 20 is a lid member that closes an opening provided in the acid suppression unit 16. The lid member is secured to the acid suppression unit 16 with bolts or the like. As illustrated in FIG. 4, a discharge valve may also be provided as a maintenance section 20' (for the sake of simplicity, this section is omitted in FIG. 5). Providing the maintenance section 20 simplifies maintenance of the acid suppression unit 16 such as replacement of the first acid suppression material 17.

The material of the first acid suppression material 17 may be the same as that described in the first embodiment.

The first acid suppression material 17 may be secured inside the acid suppression unit using fixtures or the like. In FIG. 5, a fixture 22 is provided between the first acid suppression material 17 and the maintenance section 20. The fixture 22 is a spring or the like. Separate fixtures 23 are provided between the first acid suppression material 17 and the refrigerant outlet 13 side of the acid suppression unit 16. These separate fixtures 23 are packers or sealing materials or the like.

FIG. 6 and FIG. 7 illustrate examples of the first acid suppression material.

The first acid suppression material 17 illustrated in FIG. 6 is a shape prepared by stacking and then winding a very fine wire mesh. When the first acid suppression material 17 is installed in the acid suppression unit 16, the space factor inside the acid suppression unit should be high enough to prevent inhibition of the refrigerant flow, and typically exceeds 95%.

The first acid suppression material 17 illustrated in FIG. 7 is a cylindrical block having a porous structure. The first acid suppression material 17 of FIG. 7 has a sponge-like structure, and is a solid having appropriate rigidity. The expression "appropriate rigidity" means that the structure has sufficient hardness to retain its original shape and not block the refrigerant flow path even when exposed to the refrigerant flow.

The inner surface of the acid suppression unit 16 is preferably coated with a second acid suppression material (not shown in the figures). The second acid suppression material is the same as that described in the first embodiment. By providing this second acid suppression material, the surface area across which the refrigerant can contact the acid suppression materials can be broadened.

The inner surfaces of the discharge pipe 15 and the inflow pipe 19 may also be coated with the second acid suppression material. This enables the inner surfaces of the discharge pipe 15 and the inflow pipe 19 to function as a portion of the acid suppression unit.

In the heat pump device 10 according to the present embodiment, all of the refrigerant discharged from the compressor 2 is guided into the acid suppression unit 16. The refrigerant can make contact with the acid suppression material during passage through the acid suppression unit 16. As a result, increases in the acid concentration in the refrigerant can be suppressed.

The refrigerant that has passed through the acid suppression unit 16 flows through the condenser 3, the expansion valve 4 and the evaporator 5 and is drawn into the compressor 2, and the same cycle is then repeated.

(Modification)

Figure 8:
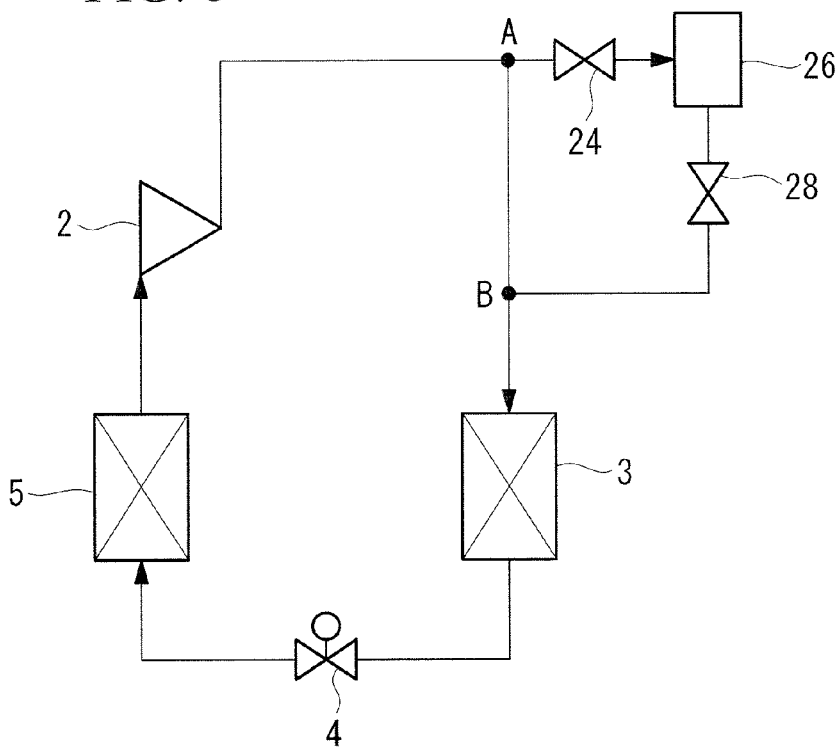
FIG. 8 A schematic structural diagram illustrating one example of a heat pump device according to a modification of the second embodiment.

FIG. 8 is a schematic structural diagram illustrating another example of the heat pump device (refrigerant circulation device) according to the present embodiment. The structure of this modification is the same as the second embodiment, with the exception of a different connection position for the acid suppression unit.

An acid suppression unit 26 is connected in parallel to the pipe connecting the compressor 2 and the condenser 3. A refrigerant inlet is connected to the upstream side A of the pipe via a valve 24. The refrigerant inlet can guide some or all of the refrigerant discharged from the compressor 2 into the storage chamber. The amount of the refrigerant guided into the storage chamber can be adjusted by opening and closing the valve 24. A refrigerant outlet is provided in a position that enables the refrigerant that has been guided into the storage chamber to pass through the acid suppression material and then flow out toward the condenser 3. The refrigerant outlet is connected to the downstream side B of the aforementioned pipe via a valve 28. Forming this small circuit simplifies maintenance of the acid suppression unit.

The refrigerant outlet may also be designed so that the refrigerant flows directly into the condenser 3.

In the heat pump device according to the present embodiment, a portion of the refrigerant discharged from the compressor 2 is diverted and guided into the acid suppression unit 26. For example, from the point A in the pipe connecting the compressor 2 and the condenser 3, 2% by volume of the refrigerant circulating through the heat pump cycle is diverted and guided into the storage chamber. The refrigerant introduced into the storage chamber can be brought into contact with the acid suppression materials (the first acid suppression material and the second acid suppression material). As a result, increases in the acid concentration in the refrigerant can be suppressed.

The refrigerant that has passed through the acid suppression unit 26 flows through the condenser 3, the expansion valve 4 and the evaporator 5 and is drawn into the compressor 2, and the same cycle is then repeated.

Third Embodiment

Figure 9:
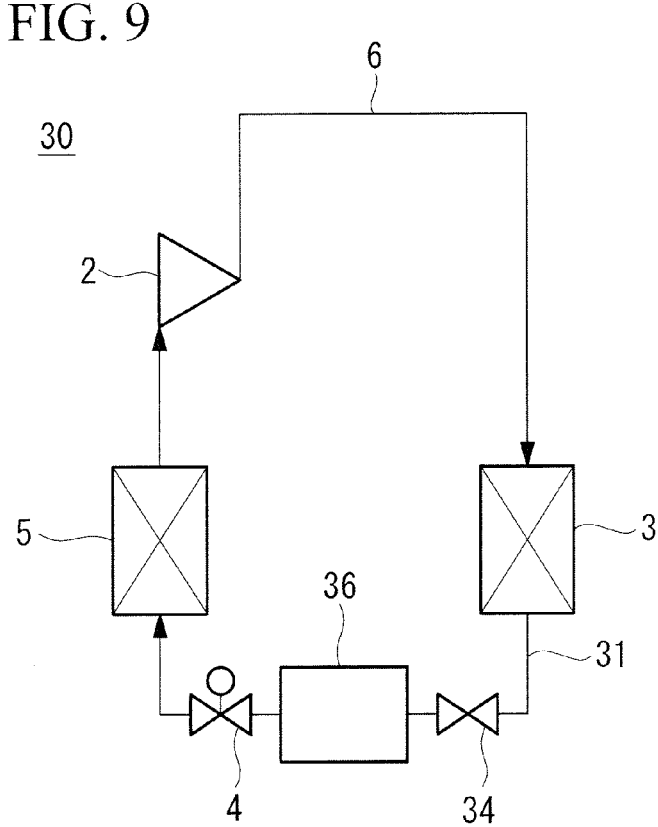
FIG. 9 A schematic structural diagram illustrating one example of a heat pump device according to a third embodiment.

With the exception of providing a separate acid suppression unit between the condenser and the expansion valve, the structure of the heat pump device according to this embodiment is the same as that of the first embodiment. FIG. 9 is a schematic structural diagram illustrating one example of the heat pump device (refrigerant circulation device) according to this embodiment.

An acid suppression unit 36 is connected in series between the condenser 3 and the expansion valve 4.

The acid suppression unit 36 comprises a storage chamber, a refrigerant inlet and a refrigerant outlet. The refrigerant inlet is connected to an outflow pipe 31 via a valve 34. The refrigerant inlet guides all of the refrigerant flowing from the condenser 3 into the storage chamber. The storage chamber is formed from a pressure-resistant container, and houses a first acid suppression material that is able to make contact with the refrigerant. The material for the first acid suppression material is the same as that described in the first embodiment. The first acid suppression material is preferably a porous structure, a mesh structure or a corrugated structure. The refrigerant outlet is designed so that the refrigerant introduced into the storage chamber flows through the first acid suppression material and then flows out toward the expansion valve 4.

The refrigerant is condensed by the condenser 3 and liquefied. The liquefied refrigerant occupies a smaller volume than the gaseous refrigerant. By providing the acid suppression unit 36 between the condenser 3 and the expansion valve 4, a larger proportion of the refrigerant can be brought into contact with the acid suppression material.

In a similar manner to the first embodiment, the inner surface of the acid suppression unit 36 is preferably coated with a second acid suppression material.

The inner surfaces of the pipes connecting the condenser 3 and the expansion valve 4 are also preferably coated with the second acid suppression material.

In the heat pump device 30 according to the present embodiment, the refrigerant discharged from the compressor 2 flows through the acid suppression unit 6 and into the condenser 3. During passage through the acid suppression unit 6, the refrigerant can make contact with the acid suppression materials (the first acid suppression material and the second acid suppression material). As a result, increases in the acid concentration in the refrigerant can be suppressed. After passing through the acid suppression unit 6, the refrigerant is introduced into the condenser 3 and condensed. The condensed refrigerant flows out of the condenser 3 and is introduced into the acid suppression unit 36. During passage through the acid suppression unit 36, the refrigerant can make contact with the acid suppression materials. As a result, any increase in the acid concentration in the refrigerant can be further suppressed.

The refrigerant that has passed through the acid suppression unit 36 flows through the expansion valve 4 and the evaporator 5 and is drawn into the compressor 2, and the same cycle is then repeated.

In the present embodiment, the acid suppression unit 36 is connected in series within the pipes connecting the condenser 3 and the expansion valve 4, but the acid suppression unit 36 may also be connected in parallel, in a similar manner to the aforementioned modification of the second embodiment.

Fourth Embodiment

In a refrigerant circulation device according to this embodiment, a separate acid suppression unit is integrated within the condenser. Other structures not described below are the same as those described in the first embodiment.

Figure 10:
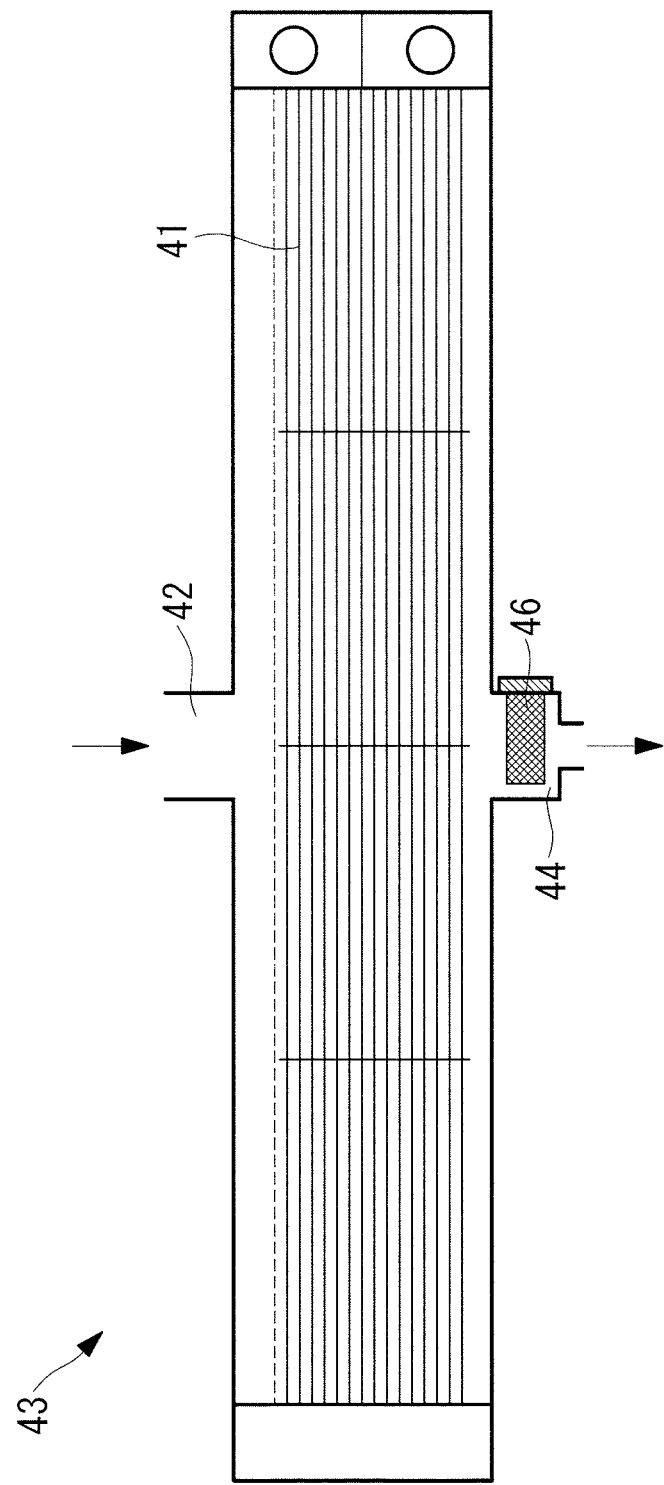
FIG. 10 A longitudinal sectional view of a condenser of a heat pump device according to a fourth embodiment.

FIG. 10 is a longitudinal sectional view illustrating the condenser of the refrigerant circulation device (heat pump device) according to this embodiment. A condenser 43 is a shell and tube heat exchanger. The condenser 43 comprises a plurality of heat transfer tubes 41, a refrigerant inlet pipe 42 and a refrigerant outlet pipe 44. The plurality of heat transfer tubes 41 are arranged horizontally, and a coolant fluid flows through the inside of these tubes. The refrigerant enters from the refrigerant inlet pipe 42, undergoes heat exchange with the coolant fluid flowing through the heat transfer tubes 41, and is then discharged from the refrigerant outlet pipe 44. In the present embodiment, an acid suppression unit 46 is provided in the refrigerant outlet pipe 44. At the outlet from the condenser 43, the refrigerant (liquid) exists in a state that fills the refrigerant outlet pipe 44, and therefore the acid suppression unit is installed immersed within the refrigerant (liquid). If the acid suppression unit 46 inhibits the flow of the refrigerant, then under maximum load operation, the refrigerant (liquid) accumulates in the condenser 43, which can cause problems such as a deterioration in the performance of the heat pump. Accordingly, the acid suppression unit 46 is preferably installed with an adequate provision of space. The acid suppression unit 46 is simply the acid suppression material itself. The acid suppression material may use the same material as that described for the first acid suppression material in the second embodiment.

By integrating the acid suppression unit 46 within the condenser 43, a separate heat-resistant container need not be provided, meaning the heat pump device can be lightened.

In the embodiments described above, a single condenser is provided, but the invention is not limited to such configurations, and a plurality of condensers may be provided. In those cases when two or more condensers are provided, the acid suppression units in the third embodiment and the fourth embodiment respectively may be provided at any point between the condenser positioned at the most upstream position (closest to the compressor) and the expansion valve. For example, in a heat pump device comprising a first condenser, a second condenser and an expansion valve in that sequence following the compressor, the acid suppression unit may be provided between the first condenser and the second condenser.

Fifth Embodiment

Figure 11:
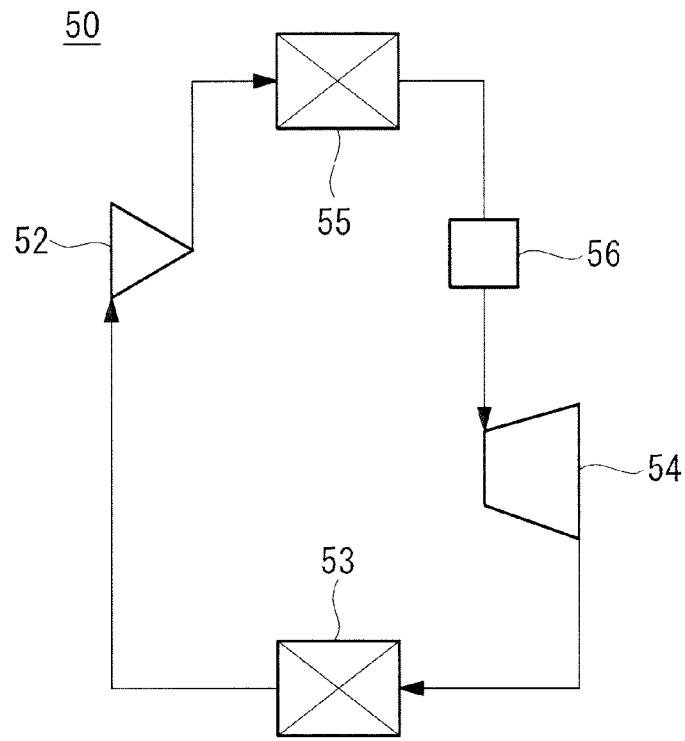
FIG. 11 A schematic structural diagram illustrating one example of an organic Rankine cycle device according to a fifth embodiment.

FIG. 11 is a schematic structural diagram illustrating one example of an organic Rankine cycle device (refrigerant circulation device) according to this embodiment.

The organic Rankine cycle device 50 comprises a pump 52, an evaporator 55, an expansion device 54, a condenser 53, and an acid suppression unit 56. The pump 52, the evaporator 55, the expansion device 54 and the condenser 53 are connected in sequence by pipes, and form a refrigerant circulation circuit (organic Rankine cycle). Each of the structural components of this organic Rankine cycle device are designed to be able to withstand the pressure from the refrigerant. An HFO similar to that described in the first embodiment fills the inside of the organic Rankine cycle as the refrigerant.

The pump 52 force feeds the refrigerant flowing out of the condenser 53 toward the evaporator 55.

The evaporator 55 can heat and evaporate the force fed low-temperature, high-pressure refrigerant using an external heat source. The heat source may be the exhaust gas or the like from a turbine or engine, and can increase the temperature of the refrigerant to 175° C. or higher. The evaporator 55 may be a boiler or an evaporator or the like.

The expansion device 54 expands the evaporated high-temperature, high-pressure refrigerant, thereby turning a turbine or the like, and driving a generator to generate electrical power.

The condenser 53 can cool and condense the high-temperature, low-pressure refrigerant that has been expanded in the expansion device 54, thus forming a refrigerant liquid. The condenser 53 may be a steam condenser or the like.

The acid suppression unit 56 suppresses increases in the acid concentration in the refrigerant. The acid suppression unit 56 is provided in a region where the temperature of the refrigerant can reach 175° C. or higher. In the present embodiment, the region where the temperature of the refrigerant can reach 175° C. or higher is positioned between the evaporator 55 and the expansion device 54. The acid suppression unit 56 includes at least a portion of the pipes connecting the evaporator 55 and the expansion device 54.

The acid suppression unit 56 preferably includes all of the pipes connecting the evaporator 55 and the expansion device 54.

The acid suppression unit 56 contains the same first acid suppression material as that described in the first embodiment.

The first acid suppression material is preferably disposed to enable continuous contact with the refrigerant from the time the refrigerant is discharged from the evaporator 55 until it flows into the expansion device 54. In other words, the first acid suppression material is preferably disposed along the entire length of the pipes that connect the evaporator 55 to the expansion device 54.

In a similar manner to the first embodiment, the inner surface of the acid suppression unit 56 is preferably coated with a second acid suppression material.

Next is a description of the operation of the organic Rankine cycle device 50.

The refrigerant used to fill the organic Rankine cycle device 50 is heated in the evaporator 55 by an external heat source, and converted to a high-temperature, high-pressure vapor. In the organic Rankine cycle device 50, the temperature of the refrigerant is highest at the outlet from the evaporator 55.

The vapor passes through the acid suppression unit 56 and flows into the expansion device 54. During passage through the acid suppression unit 56, the refrigerant can make contact with the acid suppression materials (the first acid suppression material and the second acid suppression material). As a result, increases in the acid concentration in the refrigerant can be suppressed.

The refrigerant is subjected to adiabatic expansion by the expansion device 54, and the resulting work that is generated is used to drive a turbine. The expanded refrigerant flows into the condenser 53, and is cooled to form a liquid. The condensed refrigerant is then drawn into the pump 52, and the same cycle is repeated.

<Acid Concentration in HFO>

The effect of the acid suppression material(s) was confirmed by the following test.

The test was performed using the method prescribed for the sealed tube test in JIS K2211.

The refrigerant used was HFO1234ze(Z) (manufactured by Central Glass Co., Ltd., purity: 99.8%).

The acid suppression materials tested were iron (Fe), copper (Cu), aluminum (Al), SUS304, SUS316, and a mixture containing equal volumes of iron, copper and aluminum.

The iron was a material prescribed in JIS C 2504, and a test piece having a diameter of 1.60 mm and a length of 50 mm was used. The copper was a material prescribed in JIS C 3102, and a test piece having a diameter of 1.60 mm and a length of 50 mm was used. The aluminum was a material prescribed in JIS H 4040, and a test piece having a diameter of 1.60 mm and a length of 50 mm was used. For the SUS304 and SUS316, JIS austenitic stainless steel test pieces were used. Each of the acid suppression materials was subjected to a degreasing treatment and a polishing treatment prior to testing to ensure a fresh surface.

Each of the acid suppression materials was placed in a Pyrex (a registered trademark) glass tube (diameter 10 mm×inner diameter 8 mm×length 200 mm) with 0.5 g of the refrigerant, and the glass tube was sealed. The sealed glass tube was heated at a test temperature of 175° C. to 250° C. for 14 days. When the acid suppression material was a single metal, three test pieces were used, whereas when the three metals were mixed, one test piece of each metal was used.

After 14 days, the refrigerant was analyzed using a gas chromatograph (GC-2010 plus, manufactured by Shimadzu Corporation) fitted with a flame ionization detector (FID), and an ion chromatograph (IC, ICS-2100, manufactured by Nippon Dionex K.K.). Further, the external appearance of the refrigerant before and after testing was also evaluated visually.

For comparison, the same tests were performed using 1,1,1,3,3-pentafluoropropane (HFC245fa) as the refrigerant.

The results of the FID analyses and the results of the IC analyses are shown in Table 1.

TABLE 1

| Sample No. | Test temperature [° C.] | Acid suppression material | Purity [GC %] | $F^-$ concentration [ppm] |
| --- | --- | --- | --- | --- |
| 1 | 175 | — | 99.8 | 6 |
| 2 |  | Fe, Cu, Al | 99.7 | 3 |
| 3 | 200 | — | 97.2 | 9 |
| 4 |  | Fe, Cu, Al | 99.6 | 2 |
| 5 | 225 | — | 81.1 | 9 |
| 6 |  | Fe, Cu, Al | 98.0 | 4 |
| 7 | 250 | — | 75.2 | 20 |
| 8 |  | Fe, Cu, Al | 96.3 | 5 |
| 9 |  | Fe | 82.0 | 25 |
| 10 |  | Cu | 83.4 | 59 |
| 11 |  | Al | 96.1 | 35 |
| 12 |  | SUS304 | 73.2 | 41 |
| 13 |  | SUS316 | 72.3 | 42 |
| 14 |  | Fe, Cu | 94.1 | 2 |

Figure 12:
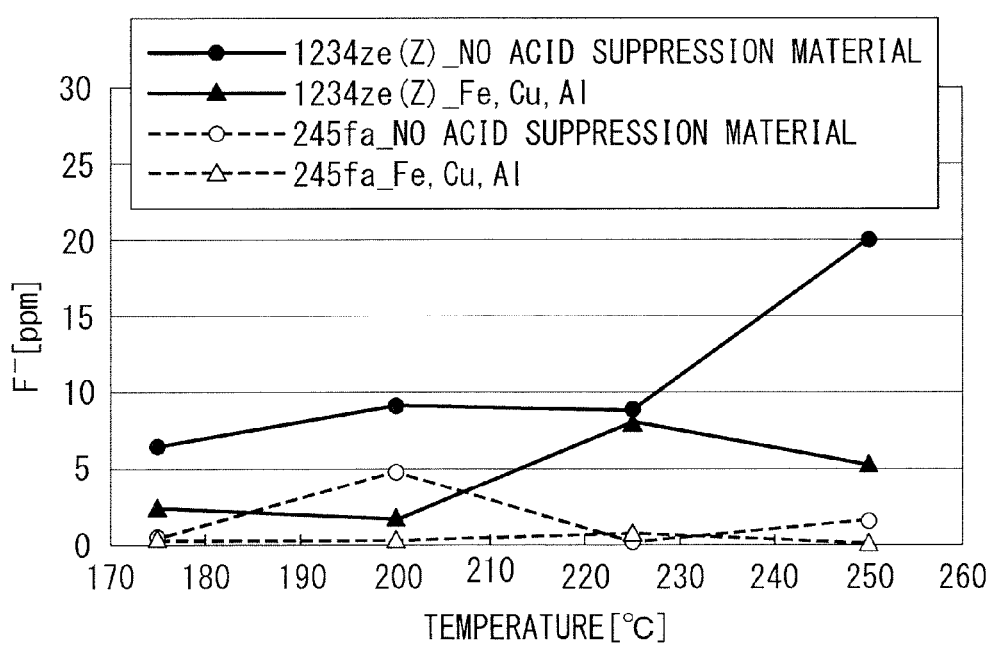
FIG. 12 A graph illustrating the fluoride ion concentration in a refrigerant.

FIG. 12 illustrates the fluoride ion concentration in the refrigerant. In the figure, the horizontal axis represents the test temperature (° C.), and the vertical axis represents the fluoride ion ($F^-$) concentration (ppm) in the refrigerant. In the figure, the black circles indicate the test results for sample Nos. 1, 3, 5 and 7. The black triangles indicate the test results for sample Nos. 2, 4, 6 and 8. The white circles indicate the test results for the samples using the refrigerant HFC245fa with no acid suppression material, and the white triangles indicate the test results for the samples using the refrigerant HFC245fa with the mixture of Fe, Cu and Al as the acid suppression material. The fluoride ion concentration in the HFC245fa was 5 ppm or less at all of the test temperatures.

When no acid suppression material was used (sample Nos. 1, 3, 5 and 7), the fluoride ion concentration in the HFO1234ze(Z) increased as the test temperature was increased. In particular, when the test temperature exceeded 225° C., the increase in the fluoride ion concentration became quite marked. When no acid suppression material was used, the fluoride ion concentration in the HFO1234ze (Z) was 6 ppm at a test temperature of 175° C. and 20 ppm at a test temperature of 250° C.

In contrast, the fluoride ion concentration in the refrigerant samples containing the acid suppression material was 3 ppm at a test temperature of 175° C. (sample No. 2) and 5 ppm at a test temperature of 250° C. (sample No. 8). The fluoride ion concentration in the refrigerant containing the acid suppression material exhibited no change in the slope of the curve even when the test temperature exceeded 225° C.

The following description focuses on the samples (Nos. 7 to 14) in which the test temperature was 250° C. The fluoride ion concentrations in those samples that used a single metal as the acid suppression material (sample Nos. 9 to 13) were similar to, or even higher than, the fluoride ion concentration in the sample containing no acid suppression material (sample No. 7). In contrast, the fluoride ion concentrations in the sample containing a mixture of three metals (iron, copper and aluminum) (sample No. 8) and the sample containing a mixture of two metals (iron and copper) (sample No. 14) were suppressed to lower values than those observed for the other samples (Nos. 7, and 9 to 13).

The purity of the HFC245fa was higher than 99.9 GC %, regardless of the test temperature.

The purity of the HFO1234ze(Z) decreased to 75.2 GC % in sample No. 7 (test temperature: 250° C.), but was maintained at 96.3 GC % in sample No. 8 (test temperature: 250° C.). In sample No. 14 (test temperature: 250° C.), the purity was maintained at 94.1 GC %.

Upon thermal decomposition, HFO1234ze(Z) forms trifluoropropyne and hydrofluoric acid. The above results confirmed that by adding an acid suppression material composed of a mixture of two or three metals to the HFO, any increase in the fluoride ion concentration (namely, the hydrofluoric acid concentration) in the HFO could be suppressed, enabling the HFO to be stabilized.

In the samples that used the acid suppression material composed of a mixture of three metals, there was no change in the external appearance of the refrigerant before and after testing, both the refrigerant and the glass tube maintained a colorless and transparent appearance, and no production of unwanted matter such as sludge was observed.

REFERENCE SIGNS LIST 1, 10, 30 Heat pump device (refrigerant circulation device)
2 Compressor
3, 43 Condenser
4 Expansion valve
5 Evaporator
6, 16, 26, 36, 46, 56 Acid suppression unit
7, 17 First acid suppression material
14, 18, 24, 28, 34 Valve
15 Discharge pipe
19 Inflow pipe
20, 20' Maintenance section
22 Fixture
23 Separate fixture
31 Outflow pipe
41 Heat transfer tube
42 Refrigerant inlet pipe
44 Refrigerant outlet pipe
50 Organic Rankine cycle device (refrigerant circulation device)
52 Pump
53 Condenser
54 Expansion device
55 Evaporator

The invention claimed is:

1. A refrigerant circulation device, comprising:
a compressor which compresses a refrigerant,
a condenser which condenses the compressed refrigerant,
an expansion value which expands the condensed refrigerant, and
an evaporator which evaporates the expanded refrigerant,
the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, the refrigerant circulation circuit comprising the compressor, the condenser, the expansion valve, and the evaporator connected in sequence, wherein
an acid suppression unit which suppresses any increase in a concentration of acid generated within the refrigerant in the refrigerant circulation circuit provided in the region where the operating temperature of the refrigerant reaches 175° C. or higher,
the acid suppression unit contains an acid suppression material comprising a structure, as a main component, including a mixture of stand-alone metals of copper, iron, and aluminum, and
the acid suppression material is a porous structure, a mesh structure or a corrugated structure.

2. The refrigerant circulation device according to claim 1, wherein
the acid suppression unit is provided between the compressor and the condenser.

3. The refrigerant circulation device according to claim 2, wherein
the acid suppression unit is provided between the condenser and the expansion valve.

4. The refrigerant circulation device according to claim 2, wherein
the acid suppression unit is integrated within the condenser.

5. An acid suppression method for a refrigerant circulation device comprising:
a compressor which compresses a refrigerant,
a condenser which condenses the compressed refrigerant,
an expansion valve which expands the condensed refrigerant, and
an evaporator which evaporates the expanded refrigerant,
the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, the refrigerant circulation circuit comprising the compressor, the condenser, the expansion valve, and the evaporator connected in sequence, wherein
an acid suppression unit which suppresses any increase in a concentration of acid generated within the refrigerant in the refrigerant circulation circuit provided in the region where the operating temperature of the refrigerant reaches 175° C. or higher,
the acid suppression unit contains an acid suppression material comprising a structure, as a main component, including a mixture of stand-alone metals of copper, iron, and aluminum, and
the acid suppression material is a porous structure, a mesh structure or a corrugated structure,
the method comprising bringing the refrigerant into contact with the acid suppression material.

6. A method for circulating a refrigerant in a refrigerant circulation device comprising:
a compressor which compresses a refrigerant,
a condenser which condenses the compressed refrigerant,
an expansion valve which expands the condensed refrigerant, and
an evaporator which evaporates the expanded refrigerant,
the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, the refrigerant circulation circuit comprising the compressor, the condenser, the expansion valve, and the evaporator connected in sequence, wherein an acid suppression unit which suppresses any increase in a concentration of acid generated within the refrigerant in the refrigerant circulation circuit provided in the region where the operating temperature of the refrigerant reaches 175° C. or higher, the acid suppression unit contains an acid suppression material comprising a structure, as a main component, including a mixture of stand-alone metals of copper, iron, and aluminum, and the acid suppression material is a porous structure, a mesh structure or a corrugated structure, the method comprising bringing the refrigerant into contact with the acid suppression material.

7. A refrigerant circulation device, comprising a pump which force feeds a refrigerant, an evaporator which heats and evaporates the force fed refrigerant using a heat source, an expansion device which expands the evaporated refrigerant, and a condenser which condenses the expanded refrigerant, the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, wherein an acid suppression unit which suppresses any increase in a concentration of acid generated within the refrigerant in the refrigerant circulation circuit provided in the region where the operating temperature of the refrigerant reaches 175° C. or higher, the acid suppression unit contains an acid suppression material comprising a structure, as a main component, including a mixture of stand-alone metals of copper, iron, and aluminum, and the acid suppression material is a porous structure, a mesh structure or a corrugated structure.

8. The refrigerant circulation device according to claim 7, wherein the acid suppression unit is provided between the evaporator and the expansion device.

9. The refrigerant circulation device according to claim 8, wherein the acid suppression unit is provided between the evaporator and the pump which force feeds the refrigerant.

10. An acid suppression method for a refrigerant circulation device comprising:

a pump which force feeds a refrigerant, an evaporator which heats and evaporates the force fed refrigerant using a heat source, an expansion device which expands the evaporated refrigerant, and a condenser which condenses the expanded refrigerant, the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, wherein an acid suppression unit which suppresses any increase in a concentration of acid generated within the refrigerant in the refrigerant circulation circuit provided in the region where the operating temperature of the refrigerant reaches 175° C. or higher, the acid suppression unit contains an acid suppression material comprising a structure, as a main component, including a mixture of stand-alone metals of copper, iron, and aluminum, and the acid suppression material is a porous structure, a mesh structure or a corrugated structure, the method comprising bringing the refrigerant into contact with the acid suppression material.

11. A method for circulating a refrigerant in a refrigerant circulation device comprising:

a pump which force feeds a refrigerant, an evaporator which heats and evaporates the force fed refrigerant using a heat source, an expansion device which expands the evaporated refrigerant, and a condenser which condenses the expanded refrigerant, the refrigerant circulation device being filled with the refrigerant comprising a hydrofluoroolefin or hydrochlorofluoroolefin having a carbon-carbon double bond within a molecular structure, and having a region in a refrigerant circulation circuit where an operating temperature of the refrigerant reaches 175° C. or higher, wherein an acid suppression unit which suppresses any increase in a concentration of acid generated within the refrigerant in the refrigerant circulation circuit provided in the region where the operating temperature of the refrigerant reaches 175° C. or higher, the acid suppression unit contains an acid suppression material comprising a structure, as a main component, including a mixture of stand-alone metals of copper, iron, and aluminum, and the add suppression material is a porous structure, a mesh structure or a corrugated structure, the method comprising bringing the refrigerant into contact with the add suppression material.

\* \* \* \* \*